Sept. 17, 1968   N. F. BRADSHAW   3,401,436
INTERNAL SPRING RING CLIP
Filed May 23, 1967   2 Sheets-Sheet 1

INVENTOR
NORMAN F. BRADSHAW
BY Robert B. Gill
ATTORNEY

United States Patent Office 3,401,436
Patented Sept. 17, 1968

3,401,436
INTERNAL SPRING RING CLIP
Norman F. Bradshaw, Rotherham, England, assignor to International Harvester Company, Chicago, Ill., a corporation of Delaware
Filed May 23, 1967, Ser. No. 640,681
Claims priority, application Great Britain, Aug. 23, 1966, 37,713/66
13 Claims. (Cl. 24—256)

ABSTRACT OF THE DISCLOSURE

A locating or holding device of circular or ring shape for use in an internal groove having relatively large external ears to facilitate placing and removing the device from the internal groove.

Background of the invention

This invention relates to spring-ring retainers of the kind known generally as snap rings and to locating means involving them. The invention is concerned with locating means using a snap ring, but of which the position and physical surroundings are such that, in previous practice, the use of a snap ring would not be practicable. Snap rings are of two species; one (with which the present invention is not concerned) is the external type contrived to be expanded by the fitter against its resilience, and which being located in (for example) an externally-open groove and released, springs inwards into the groove. The other type, the internal snap ring, is for use in an internally-open groove. This type is contracted by the fitter against its resilience, inserted, and when released expands into the groove. It is with this type of snap ring, and with complementary engineering components, that this invention is concerned. In general, snap rings are used as locating means usually as to relative axial movement between two such elements as a shaft and a bored part; or a bearing element in a housing, or the like; or as a stop to locate a limit of movement of a part sliding in another.

There are many situations and locations in engineering designs, in which it would be convenient to use an internal snap ring if it were externally accessible for placement or removal; and the invention satisfies the practical requirements in at least some such cases.

Most snap rings have ears or lugs (often with holes in them) for the use therewith of a fitter's tool which either contracts or expands the ring for placement or removal. Such ears, in the case of external snap rings, extend externally and radially from the outer margin of the nearly-circular part; and in the case of internal snap rings extend internally and radially from the inner margin. This indeed corresponds to the usual situations in which external and internal snap rings respectively are used, because access for a tool is respectively from outside or inside of the shaft, bore, or whatever part it is to which the ring is fitted.

Summary of the invention

According to this invention and in contrast to the known practice, the internal snap ring has externally-extending ears. According to the environment of its use, this simple change can have far-reaching consequences in the economy of design of related components, and this will be demonstrated by the example described below.

The invention further includes this, that the ears extend radially from the outer margin of the main part of the snap ring, by a radial dimension which, as related to the dimensions of the ring, is far in excess of that of any snap ring ears hitherto known. For example, the effective length (that is, measured to the center of a tool-hole in the ear) is about the same as the radius of the main part of the relaxed snap ring measured internally.

According to a further aspect of the invention, a component having a bore in it which is internally grooved for reception of an internal snap ring also has an aperture, passage, or relieved portion leading from the bore to a location accessible to a snap ring tool and adapted to accommodate the externally-projecting ears of an internal snap ring. This again will be explained more clearly by way of example.

Brief description of the drawing

In the accompanying drawings:
FIGURE 3 is an elevation of the same perpendicular to FIGURE 2.

Description of the preferred embodiment

Figure 1:
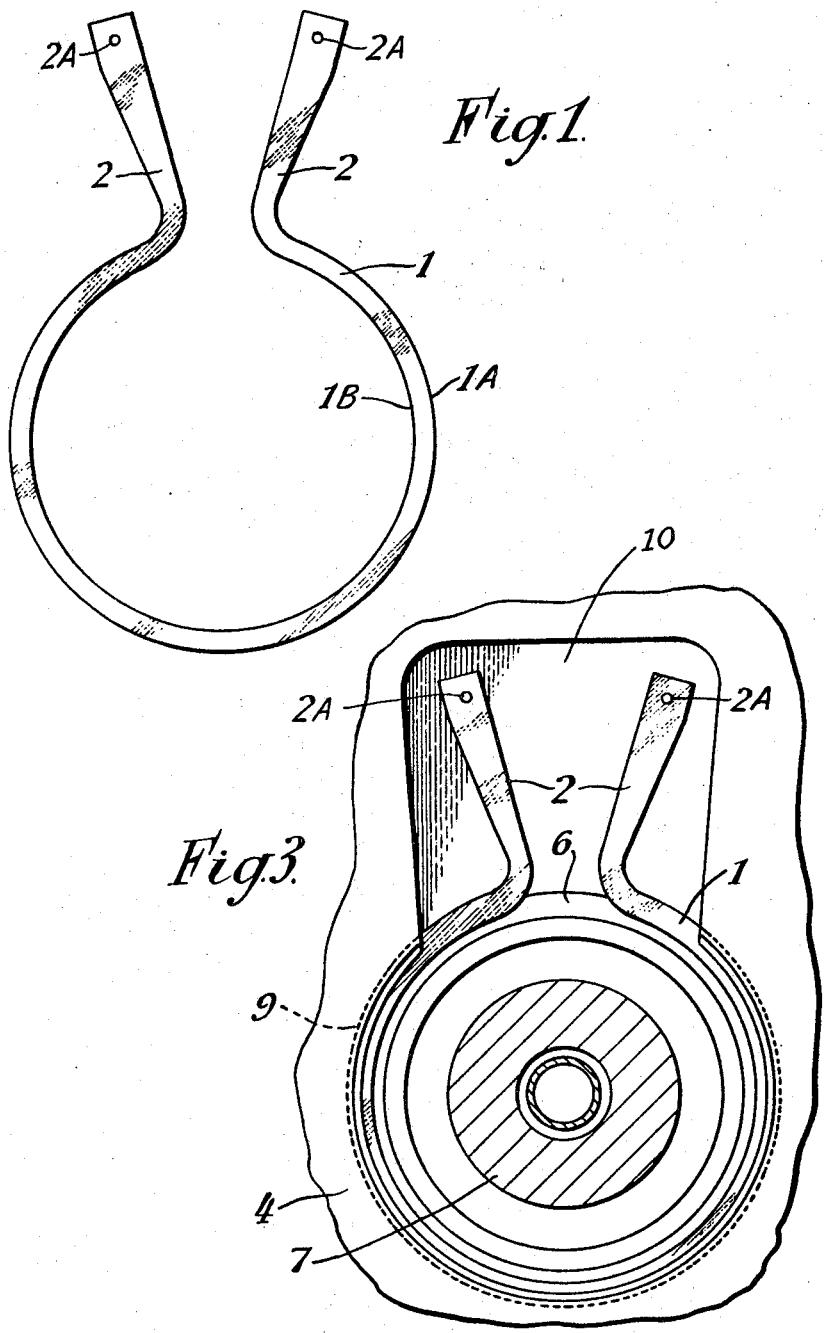
FIGURE 1 illustrates a snap ring according to the invention.

In FIGURE 1 the snap ring is shown having a main portion 1 whose outer margin 1A and inner margin 1B are nearly complete concentric circles. The ends are turned outwards and extended as a pair of ears 2 having tool-engaging holes 2A. Flat spring-steel or steel of sufficient resilience, or flat resilient plastic, is the material. It will be noted that the ears 2 have straight adjacent inner edges which diverge radially outward. This enables them to be brought together by straining them by the plier-like fitter's tool, the gap in the near-circle of 1 then being closed. In this strained condition the margin 1A will be clear of the internal groove presupposed to be provided to receive the ring. The ears 2 are in length, measured as between the outer margin 1A to the holes 2A, about equal to the internal radius of the margin 1B.

Figure 2:
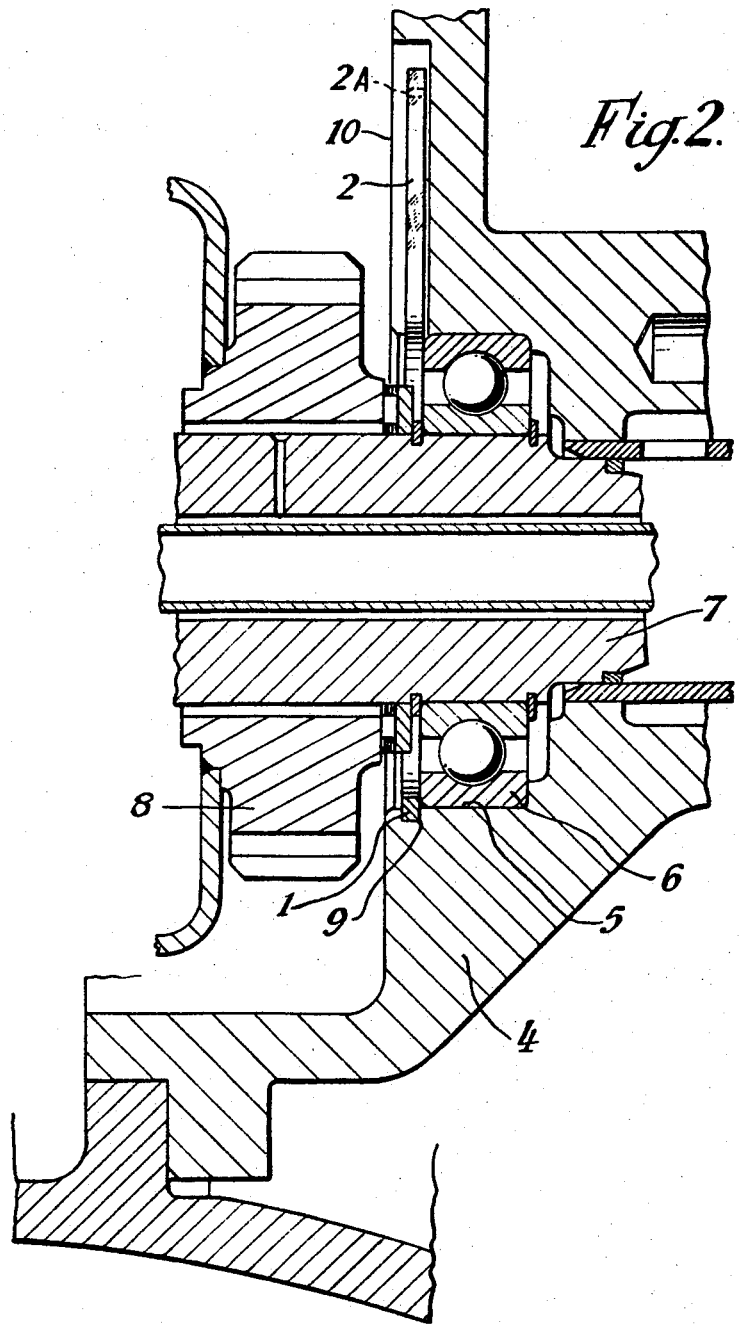
FIGURE 2 is a sectional view of purely exemplary engineering components involving the use of the snap ring of FIGURE 1.

FIGURES 2 and 3 illustrate components forming a typical environment for such a spring-ring.

In this example, a bearing housing 4 (in actual fact the example is part of a transmission system) is partially illustrated, and in a bore 5 is a ball-bearing having its outer race at 6. The bearing supports a shaft 7 on which is mounted a pinion 8 so closely adjacent to the ball-bearing that access to the bore 5, even with a special tool, would be quite impracticable. In the bore 5 is an internal groove 9 (see particularly upper part of FIGURE 2) to receive the main part 1 of the snap ring of FIGURE 1, which when emplaced retains the race 6. The groove 9 is, however, not continuously annular but it widens out into a slightly fan-shaped relief or recess 10 (see especially FIGURE 3) in the face of the part 4, and extends well beyond the pinion 8. The ears 2 lie in the recess 10, and in their relaxed (i.e. emplaced) condition they are shown in FIGURE 3. To dismantle, the ears 2 are nipped together by the fitter's tool, and the ring can now be extracted from the bore 5 so that it lies loosely surrounding the shaft 7. Now the ball-bearing can be removed from its bore.

Previously, in the particular case chosen as the example, the housing 4 was made in two quite expensively-machined mating parts, with intervening seals, simply because the race 6 had to be retained by an integral flange. The result of the novel snap ring and small adaptation constituted by the provision of the recess 10 is therefore a relatively very significant reduction in cost.

While an illustrative embodiment of the invention is shown in the drawings and has been described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

What I claim is:
1. A snap ring of the type having a non-continuous portion of near-diameter with spaced-apart ends, and a pair of ears one on each spaced-apart end, the improvement characterized by: the pair of ears having confronting straight sides diverging radially outward from the spaced-apart ends, and tool-receiving means on the pair of ears adapted to receive a tool for bringing the spaced-apart ends together and forming a generally continuous portion of diminished near-diameter.

2. A snap ring according to claim 1, and the pair of ears having a magnitude substantially one-half the near-diameter of the non-continuous portion.

3. A snap ring according to claim 1 and the non-continuous portion having an inner periphery of near-inside diameter, the confronting straight sides diverging radially outward from the inner periphery.

4. A snap ring according to claim 3 and the magnitude of the confronting straight sides being substantially one-half the near-inside diameter of the inner periphery.

5. A snap ring according to claim 4, and the non-continuous portion having an outer periphery of near concentric diameter with the inner periphery, and the tool-receiving means being a socket on each ear located at a distance taken radially from the outer periphery to a point on each ear of less than one-half the near-inside diameter of the inner periphery.

6. A snap ring according to claim 1 for use in combination with a housing having a bore including an annular groove in the periphery of the bore adapted to receive the non-continuous portion, there being a recess in the housing extending radially outward from the annular groove adapted to nest the confronting straight sides diverging radially outward from the spaced-apart ends of the non-continuous portion.

7. A snap ring for use in combination with a housing according to claim 6, and the tool-receiving means being a socket on each ear located accessible in the recess to a tool for inserting and removing the non-continuous portion into and from the annular groove.

8. A snap ring for use in combination with a housing according to claim 6 further including a shaft having shoulder means carried within the bore of the housing, and the non-continuous portion having outer and inner peripheries of near-concentric diameters, whereby the outer periphery is received by the groove and the inner periphery abuts the shoulder means and locates the shaft within the bore.

9. A snap ring for use in combination with a housing according to claim 8, and the tool-receiving means being a socket on each ear accessible in the recess to a tool for squeezing the diverging confronting straight sides together and contracting the outer periphery of the snap ring below the shoulder means on the shaft to facilitate inserting and removing the shaft into and from the bore.

10. In the combination with a housing having a bore including an annular groove in the periphery of the bore, a retainer having an outer periphery adapted to be received by the groove, the outer periphery having a radial gap defining spaced-apart ends, a pair of ears one on each spaced-apart end diverging radially outward from the outer periphery, a recess in the housing extending radially outward from the annular groove adapted to receive the diverging pair of ears, and tool-receiving means on the pair of ears accessible in the recess to a tool adapted for squeezing the diverging pair of ears together and contracting the outer periphery for inserting and removing the retainer into and from the annular groove.

11. In the combination according to claim 10, and the retainer having an inner periphery substantially concentric with the outer periphery, each ear having a confronting straight side in non-parallel relation to each other, and the confronting straight sides of the pair of ears diverging radially outward from the inner periphery.

12. In the combination according to claim 11, and the confronting straight sides having a magnitude of substantially one-half the diameter of the inner periphery, and the recess of a magnitude sufficient for receiving the diverging confronting straight sides.

13. In the combination according to claim 11, and the tool-receiving means being sockets on each ear located at a distance taken radially from the outer periphery to a point on each ear of less than one-half the diameter of the inner periphery.

References Cited
UNITED STATES PATENTS

| | | | |
|---|---|---|---|
| 814,822 | 3/1906 | Anker-Holth | 308—189 |
| 1,362,215 | 12/1920 | Appelt. | |
| 2,051,704 | 8/1936 | Harris | 308—236 |

FOREIGN PATENTS

| | | |
|---|---|---|
| 676,233 | 5/1939 | Germany. |

DONALD A. GRIFFIN, *Primary Examiner.*